United States Patent
Saga et al.

(10) Patent No.: US 6,738,270 B2
(45) Date of Patent: May 18, 2004

(54) PARALLEL POWER SOURCE SYSTEM

(75) Inventors: Ryohei Saga, Takasaki (JP); Norikazu Tokunaga, Hitachi (JP); Masahiro Hamaogi, Odawara (JP)

(73) Assignee: Renesas Technology Corporation, Tokyo (JP)

( * ) Notice: Subject to any disclaimer, the term of this patent is extended or adjusted under 35 U.S.C. 154(b) by 254 days.

(21) Appl. No.: 10/003,233

(22) Filed: Dec. 6, 2001

(65) Prior Publication Data

US 2002/0074862 A1 Jun. 20, 2002

(30) Foreign Application Priority Data

Dec. 15, 2000 (JP) ........................................ 2000-381151

(51) Int. Cl.[7] .............................. H02H 7/10; H02M 7/00
(52) U.S. Cl. ............................... 363/50; 363/65; 363/69
(58) Field of Search ........................ 363/50, 55, 56.01, 363/65, 67, 69, 70, 71, 52, 53; 307/18, 24, 31, 33, 35

(56) References Cited

U.S. PATENT DOCUMENTS 5,768,117 A * 6/1998 Takahashi et al. ............ 363/65
6,014,322 A * 1/2000 Higashi et al. ................ 363/65
6,594,163 B2 * 7/2003 Tsai ............................. 363/50

* cited by examiner

Primary Examiner—Jessica Han
(74) Attorney, Agent, or Firm—Antonellli, Terry, Stout, & Kraus, LLP (57) ABSTRACT

Disclosed is a parallel power source system which has a plurality of power supply units connected in parallel to one another and is designed in such a way that a voltage loss in an inverse-current preventing circuit provided in each power supply unit is reduced, the flexibility of the system design including lengths of power source wirings is maintained and when a short circuit failure occurs in some power supply unit, power supply from the other power supply units continues stably without significantly changing a voltage supplied to a load. The inverse-current preventing circuit comprises an MOS transistor that is intervened in series in an output path in each power supply unit and forms a switch circuit which is normally on, and a potential difference response circuit which operates to turn off the MOS transistor when a potential on the current-output side of the MOS transistor becomes greater than a potential on the current-input side thereof by at least a given amount.

5 Claims, 7 Drawing Sheets

PARALLEL POWER SOURCE SYSTEM

BACKGROUND OF THE INVENTION

1. Field of the Invention

The present invention relates to a technique that is effective when adapted to a power source system which performs parallel power supply to a load from a plurality of power supply units, e.g., a technique that is effective when adapted to the operational power source of a server system.

2. Description of the Related Art

A system that is demanded to be always in operation, such as a server system, requires a very reliable power source system in order to avoid interruption during system operation. There is a limit to keep the reliability of the power source system with a single power supply unit. As a solution to this limit, a parallel power source system has been proposed which uses a plurality of power supply units in parallel so that even when a short circuit failure occurs in some power supply unit, the other power supply units can keep supplying power to the system or load.

Figure 5:
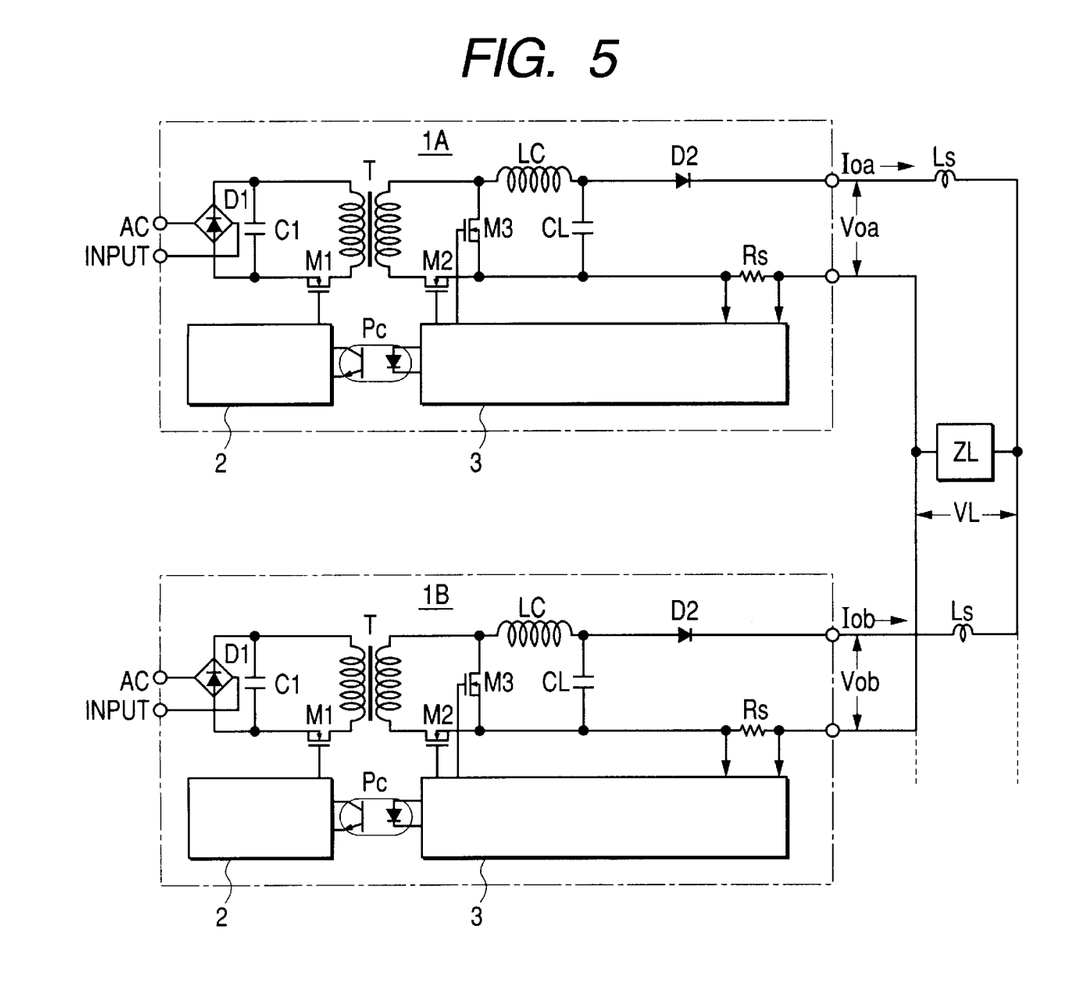
FIG. 5 is a circuit diagram showing a parallel power source system according to the related art.

FIG. 5 shows an example of the structure of the parallel power source system.

The illustrated power source system is so designed as to supply power to a single common load ZL from the output terminals of a plurality of power supply units 1A and 1B, so that even when one power supply unit 1A, for example, fails, the other power supply unit 1B can ensure power supply to the load ZL.

This parallel structure can significantly improve the reliability of power supply. In addition, a single power supply unit or a combination of fewer kinds of power supply units can cope with multifarious power supply scales. Another advantage lies in that replacement, inspection or the like of a power supply unit can be carried out while keeping supplying power to the load ZL.

The power supply units 1A and 1B shown in the diagram are switching control type DC power supply units which generate DC power outputs of predetermined voltages Voa and Vob from AC input supply voltages (AC 100/200 V: 50/60 Hz) Each of the power supply units 1A and 1B has its power input side and power output side insulated and isolated from each other on the primary side and secondary side of a high frequency transformer T, and has a feedback control path from the secondary side of the transformer T to the primary side insulated and isolated by a photo coupler Pc.

A bridge type rectifying circuit D1 for primary rectification and smoothing, a capacitive element Cl, a switching power MOS transistor M1 and a primary control circuit 2 which includes a PWM (Pulse Width Modulation) control circuit are provided on the power input side of each power supply unit to supply a high frequency pulse current to the primary coil of the high frequency transformer T.

MOS transistors M2 and M3, which constitute a synchronous rectifying circuit, an inductance element LC and a capacitive element CL for secondary smoothing, a resistive element Rs for current detection, a secondary control circuit 3 which is linked to the primary control circuit 2 via the photo coupler Pc, and an inverse-current preventing diode D2 are provided on the power output side of each power supply unit to rectify and smooth high frequency electromotive force induced on the secondary coil of the high frequency transformer T. The rectified and smoothed electromotive force is led to an output terminal.

The power supply units 1A and 1B may suffer a possible failure of a short-circuited damage on the secondary smoothing capacitive element CL. If such a failure occurs in any power supply unit 1A or 1B, the power supply output of the other power supply unit 1B or 1A is also short-circuited, causing the entire power source system to be down (inoperative). To avoid it, a diode D2 is intervened in series in the output path in each of the power supply units 1A and 1B as illustrated in the diagram. The inverse-current preventing operation of the diode D2 realizes a highly reliable parallel power source system such that even when one power supply unit 1A fails, the other power supply unit 1B can keep supplying power to the load ZL.

The present inventors found out that the above-described technique has the following shortcoming.

To speed up the operation information processing systems, such as a server, and reduce the consumed power thereof, the operational supply voltage of the systems has become lower, for example, from 5 V to 3 V. That is, a lower supply voltage and a large operational current are sought out. In this case, the parallel power source system should face a considerable issue of power loss caused by a voltage drop in the forward direction of the diode D2 that prevents the inverse current. To cope with the problem, the present inventors have considered the prevention of the inverse current using a power MOS transistor M4 which has a small voltage drop or power loss as shown in FIG. 6.

Figure 6:
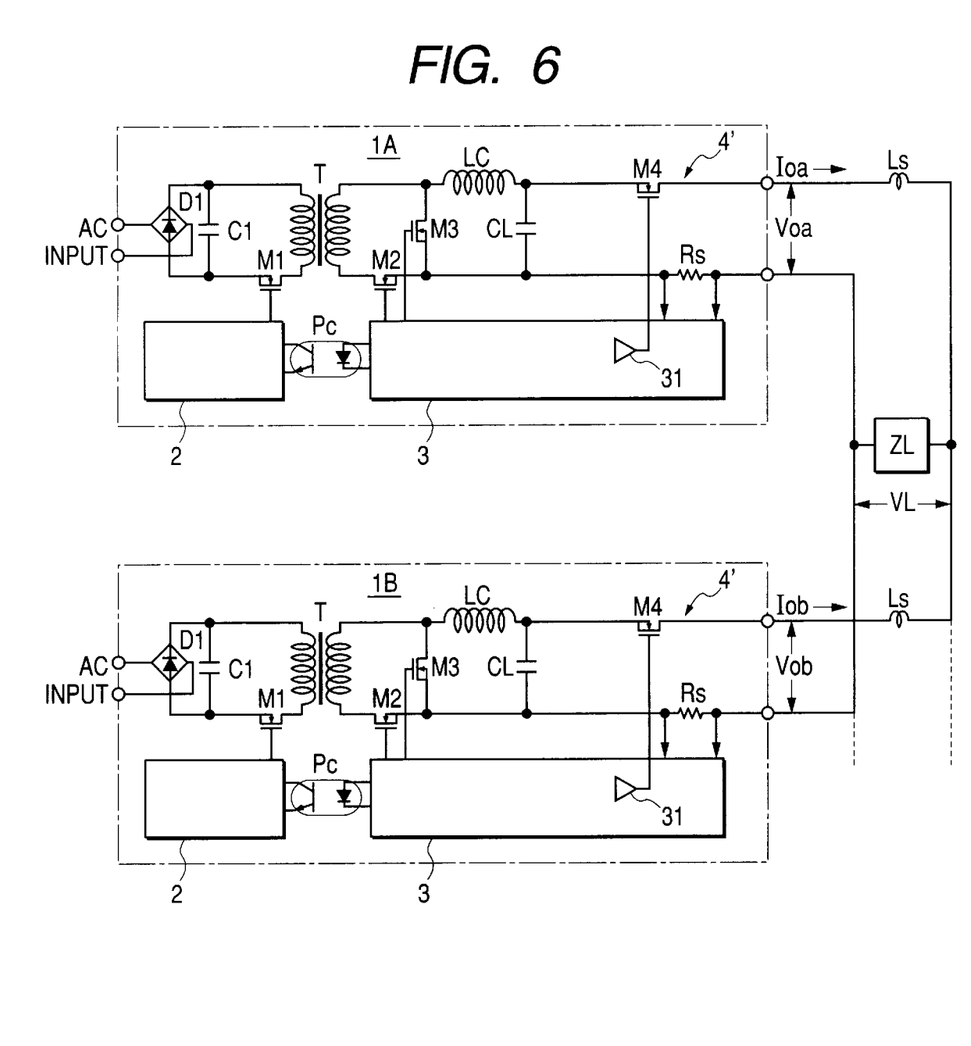
FIG. 6 is a circuit diagram of a parallel power source system which was studied prior to the invention.

FIG. 6 exemplifies the results of the study on the parallel power source system by the present inventors.

The illustrated parallel power source system has the power MOS transistor M4 intervened in series in the output path in each of the power supply units 1A and 1B that constitutes the system, monitors output currents Ioa and Iob are monitored via the current detecting resistive element Rs and performs such control as to turnoff the MOS transistor M4 when the direction of the current flowing in the output path in each unit 1A or 1B is reversed to the direction of the current flowing in the normal operation. That is, the MOS transistor M4 is turned on or off by a current response based on the detection of the current. This ON/OFF control of the MOS transistor M4 is performed within the secondary control circuit 3 and its control output is supplied to the gate of the MOS transistor M4 via a gate drive circuit 31. The above-described circuit structure forms an inverse-current preventing circuit 4' having a small voltage loss in each power supply unit 1A, 1B and can thus construct a parallel power source system with a high power efficiency.

Figure 7:
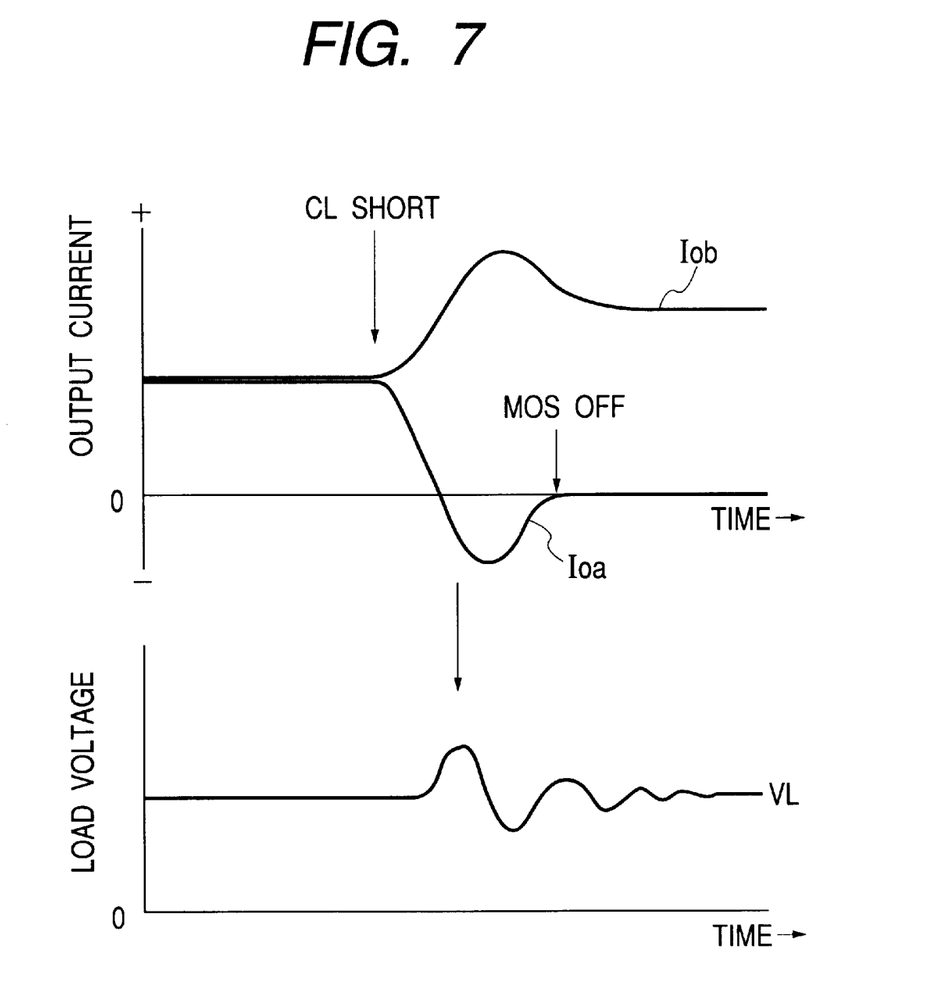
FIG. 7 is a chart of operational waveforms at essential portions of the system shown in FIG. 6.

However, the present inventors found out that while the parallel power source system shown in FIG. 6 could reduce the voltage loss of the inverse-current preventing circuits 4', a supply voltage VL to be applied to the load ZL would transiently show a significant change as shown in FIG. 7 and exceeds the rated voltage range of the load ZL when the inverse-current preventing circuit 4' in any power supply unit should operate.

Specifically, in case where the secondary smoothing capacitive element CL in one (e.g., 1A) of the two power supply units 1A and 1B has a short circuit failure, the logical expectation is such that while the output current Ioa from that unit 1A decreases rapidly, the output current Iob from the other unit 1B increases so that the voltage VL to be supplied to the load ZL should be maintained constant. It was however discovered that actually the voltage VL to be supplied to the load ZL would not become constant and the load voltage VL would significantly vary in the process of compensating for a reduction in the output current Ioa of one unit 1A with an increase in the output current Iob of the other unit 1B. It was also found out that the variation in load voltage VL would occur due to a parasitic inductance Ls distributed in the power source wiring to the load ZL when the output current Ioa of one unit 1A was commutated from the forward direction to the reverse direction.

Suppressing a variation in load voltage VL therefore requires that the parasitic inductance Ls should be reduced as much as possible. To fulfill the requirement, the power source wiring should be made as short as possible. Realizing the short power source wiring in the parallel power source system would raise a new problem of considerably impairing the flexibility of the system design. If the power source wiring is shortened, intervention of some sort of a parasitic inductance Ls is unavoidable. After all, it was not possible to fundamentally overcome the problem with the shortening of the power source wiring.

SUMMARY OF THE INVENTION

Accordingly, the invention has been made in consideration of the background and the knowledge mentioned above and aims at providing a technique that can reduce a voltage loss in an inverse-current preventing circuit provided in each of parallel-connected plural power supply units in a parallel power source system, maintain the flexibility of the system design including lengths of power source wirings, and allow other power supply units than any power supply unit having a short circuit failure to keep supplying power stably without significantly changing a voltage supplied to a load.

It is another object of the invention to provide an inverse-current preventing circuit suitable for use in the parallel power source system.

Typical ones of the subject matters of the invention disclosed in the present application will be briefly described below.

According to one aspect of the invention, there is provided a parallel power source system comprising a plurality of power supply units for supplying powers from output terminals thereof to a load in parallel; and inverse-current preventing circuits, respectively provided in the power supply units, for preventing inverse currents from the output terminals of the respective power supply units, each inverse-current preventing circuit including an MOS transistor which is intervened in series in an output path and forms a switch circuit for supplying power to a load, and a potential difference response circuit which operates to turn off the MOS transistor when a potential on a current-output side of the MOS transistor becomes greater than a potential on a current-input side thereof by at least a given amount.

When a short circuit failure occurs in a power supply unit, this parallel power source system can activate the inverse-current preventing circuit before the inverse current flows into that failed unit. This can achieve the first object of providing the technique that can reduce a voltage loss in an inverse-current preventing circuit provided in each of parallel-connected plural power supply units in a parallel power source system, maintain the flexibility of the system design including lengths of power source wirings, and allow other power supply units than any power supply unit having a short circuit failure to keep supplying power stably without significantly changing a voltage supplied to a load.

The parallel power source system may further comprise a current response circuit for controlling the MOS transistor to be turned off when a direction of a current flowing in the output path in each of the power supply units is reversed to a direction of a current flowing in a normal operation. This modified system provides double measures, a circuit responsive to a potential difference and a circuit responsive to a current, to ensure the inverse-current preventing state of the current from the output terminal. The double measures can prevent a failed unit from interfering with normal units more reliably.

In the parallel power source system or the modified system, the potential difference response circuit may comprise a charging circuit for charging a capacitive element in a forward direction of a diode with a potential appearing at an output terminal; and a voltage control transistor which is turned on by a difference between a charge voltage of the charging circuit and a voltage on the current-input side of the MOS transistor to perform clamp control of a gate-source voltage of the MOS transistor. It is therefore possible to relatively easily construct the inverse-current preventing circuit that demonstrates a fast response when a short circuit failure occurs in a power supply unit.

In the second modified parallel power source system, the voltage control transistor may be a bipolar transistor. That is, the inverse-current preventing circuit in the second modified parallel power source system can be constructed by using an npn or pnp bipolar transistor.

According to another aspect of the invention, there is provided a semiconductor integrated circuit including an inverse-current preventing circuit which comprises a switching MOS transistor for performing ON/OFF control of a current; a charging circuit for charging a capacitive element in a forward direction of a diode with a potential appearing on a current-output side of the MOS transistor; and a voltage control transistor which is turned on when a charge voltage of the charging circuit becomes higher than a voltage on a current-input side of the MOS transistor by at least a given amount to set a gate-source voltage of the MOS transistor to an OFF level. In this case, the inverse-current preventing circuit can be constructed as an independent unit which can be made into an IC (semiconductor integrated circuit). The use of this unit can reduce a voltage loss in an inverse-current preventing circuit provided in each of parallel-connected plural power supply units in a parallel power source system, maintain the flexibility of the system design including lengths of power source wirings, and allow other power supply units than any power supply unit having a short circuit failure to keep supplying power stably without significantly changing a voltage supplied to a load when the short circuit failure has occurred in that power supply unit.

The aforementioned objects of the invention and other objects and features various changes and modifications within the spirit and scope of the invention will become apparent from the following detailed description and the appended claims in conjunction with the accompanying drawings. In the accompanying drawings, same reference numerals indicate same or similar portions.

DETAILED DESCRIPTION OF THE PREFERRED EMBODIMENTS

Preferred embodiments of the invention will now be described with reference to the accompanying drawings. The following are reference numerals used in the drawings.

1A, 1B: power supply unit
2: primary control circuit
3: secondary control circuit
4': inverse-current preventing circuit (related art)
4: inverse-current preventing circuit (the invention)
Pc: photo coupler
C1: primary smoothing capacitive element
C3: capacitive element
CL: secondary smoothing capacitive element
D1: bridge type rectifying circuit for primary rectification
D2: inverse-current preventing diode
D3: diode
LC: secondary smoothing inductance element
Ls: parasitic inductance
M1: switching power MOS transistor M1
M2, M3: MOS transistor (synchronous rectifying circuit)
M4: power MOS transistor M4 for preventing an inverse current
Ioa: output current of power supply unit 1A
Iob: output current of power supply unit 1B
Q1: control transistor
R1, R2, R3: resistive element
Rs: current detecting resistor
Voa: output voltage of power supply unit 1A
Vob: output voltage of power supply unit 1B
VL: voltage to be supplied to load ZL
T: high frequency transformer
ZL: load of power source system (e.g., server system)

Figure 1:
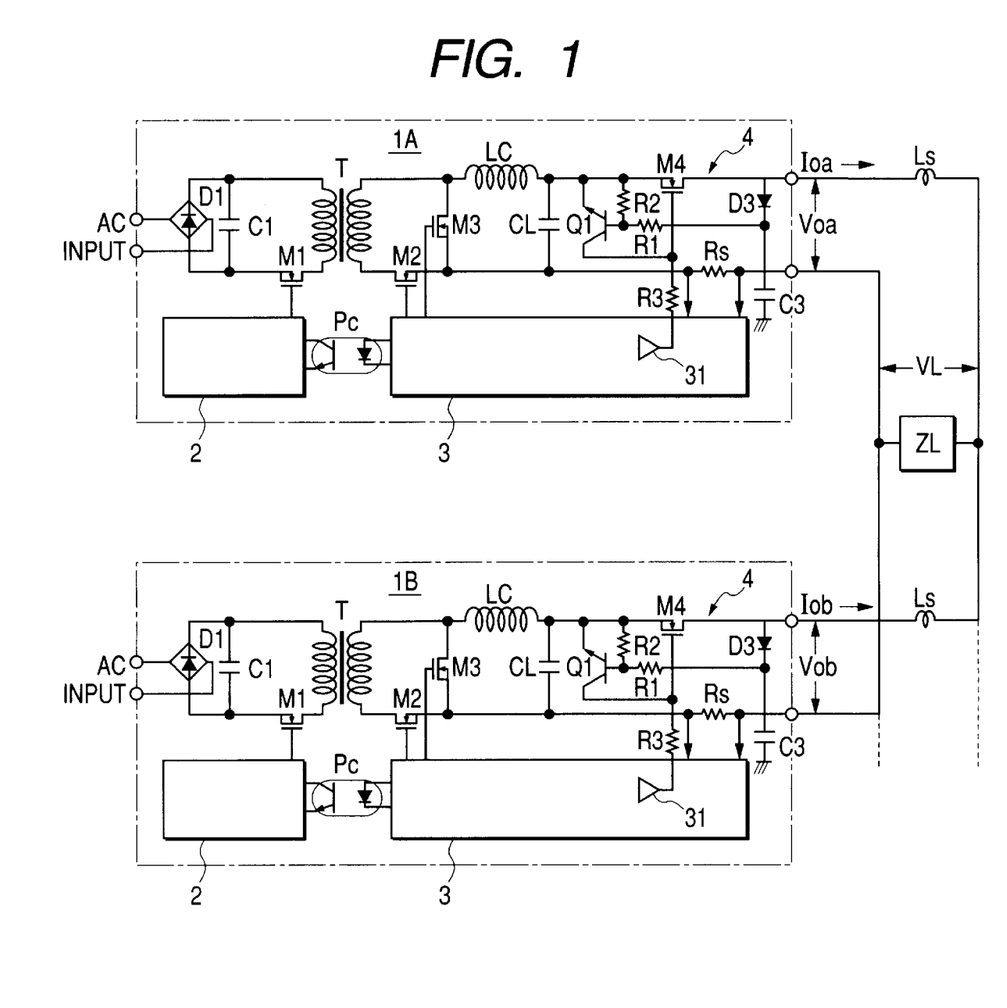
FIG. 1 is a circuit diagram illustrating an embodiment of a parallel power source system according to the invention.

FIG. 1 illustrates one embodiment of a parallel power source system to which the technique of the invention is adapted.

The power source system shown in the diagram has an inverse-current preventing circuit 4 which supplies power to a single common load ZL of, for example, a server system in parallel from individual output terminals of plural power supply units 1A and 1B and prevents the inverse flow of currents Ioa and Iob from the output terminals of the power supply units 1A and 1B.

The power supply units 1A and 1B are switching control type DC power supply units which generate DC power outputs of predetermined voltages Voa and Vob from AC input supply voltages (AC 100/200 V: 50/60 Hz). Each of the power supply units 1A and 1B has its power input side and power output side insulated and isolated from each other on the primary side and secondary side of a high frequency transformer T, and has a feedback control path from the secondary side of the transformer T to the primary side insulated and isolated by a photo coupler Pc.

A bridge type rectifying circuit D1 for primary rectification and smoothing, a capacitive element C1, a switching power MOS transistor M1 and a primary control circuit 2 which includes a PWM control circuit are provided on the power input side of each power supply unit to supply a high frequency pulse current to the primary coil of the high frequency transformer T.

MOS transistors M2 and M3, which constitute a synchronous rectifying circuit, an inductance element LC and a capacitive element CL for secondary smoothing, a current detecting resistive element Rs, and a secondary control circuit 3 which is linked to the primary control circuit 2 via the photo coupler Pc are provided on the power output side of each power supply unit to rectify and smooth high frequency electromotive force induced on the secondary coil of the high frequency transformer T, thereby generating DC power. The DC power is led to an output terminal via the current detecting resistive element Rs and the inverse-current preventing circuit 4.

The inverse-current preventing circuit 4 comprises an n channel power MOS transistor M4, an npn bipolar transistor Q1, a diode D3, a capacitive element C3, and resistive elements R1 and R2. The MOS transistor M4 is intervened in series between the secondary smoothing capacitive element CL and the output terminal. The diode D3 and the capacitive element C3 form a charging circuit. The charging circuit charges the capacitive element C1 with a voltage which appears on the output terminal in the forward direction of the diode D1.

In a steady state where the power supply unit 1A, 1B operates normally, the power MOS transistor M4 keeps the ON state in response to a gate voltage applied from a driver 31 in the secondary control circuit 3 via a resistive element R3. Based on a current detection voltage divided by the current detecting resistive element Rs, the secondary control circuit 3 monitors the level and direction of the current that flows in each power supply unit 1A, 1B. When the direction of the current is reversed to the current direction in the normal operation, application of the gate voltage is stopped. That is, a current response circuit is formed which sets the MOS transistor M4 off when the direction of the current flowing in the output path in the power supply unit 1A, 1B is reversed to the current direction in the normal operation.

The npn bipolar transistor Q1 has its collector and emitter connected in parallel between the gate and source of the MOS transistor M4 and its base connected to the charge side electrode of the capacitive element C3 via a resistive element R1. The resistive element R2 is connected in parallel between the base and emitter of the bipolar transistor Q1. When the charge voltage of the capacitive element C3 charged from the output terminal side via the diode D3 becomes higher than the charge voltage of the secondary smoothing capacitive element CL by at least a given amount, the base current flows, thus turning on the transistor Q1. The ON action of the transistor Q1 clamps the gate-source voltage of the MOS transistor M4 to the OFF level.

That is, the bipolar transistor Q1, the diode D3, the capacitive element C3 and the resistive elements R1 and R2 form a potential difference response circuit which operates to forcibly turn off the MOS transistor M4 when the current-output side voltage of the MOS transistor M4 intervened in series in the output path in each power supply unit 1A, 1B as a normally-ON type switch circuit becomes higher than the current-input side voltage by at least a given amount. The potential difference response circuit operates independently of the secondary control circuit 3 that has the current response circuit, and its operational threshold value is set based on parameters, such as the forward voltage of the diode D1, the base-emitter voltage of the bipolar transistor Q1 and the resistances of the resistive elements R1 and R2.

Figure 2:
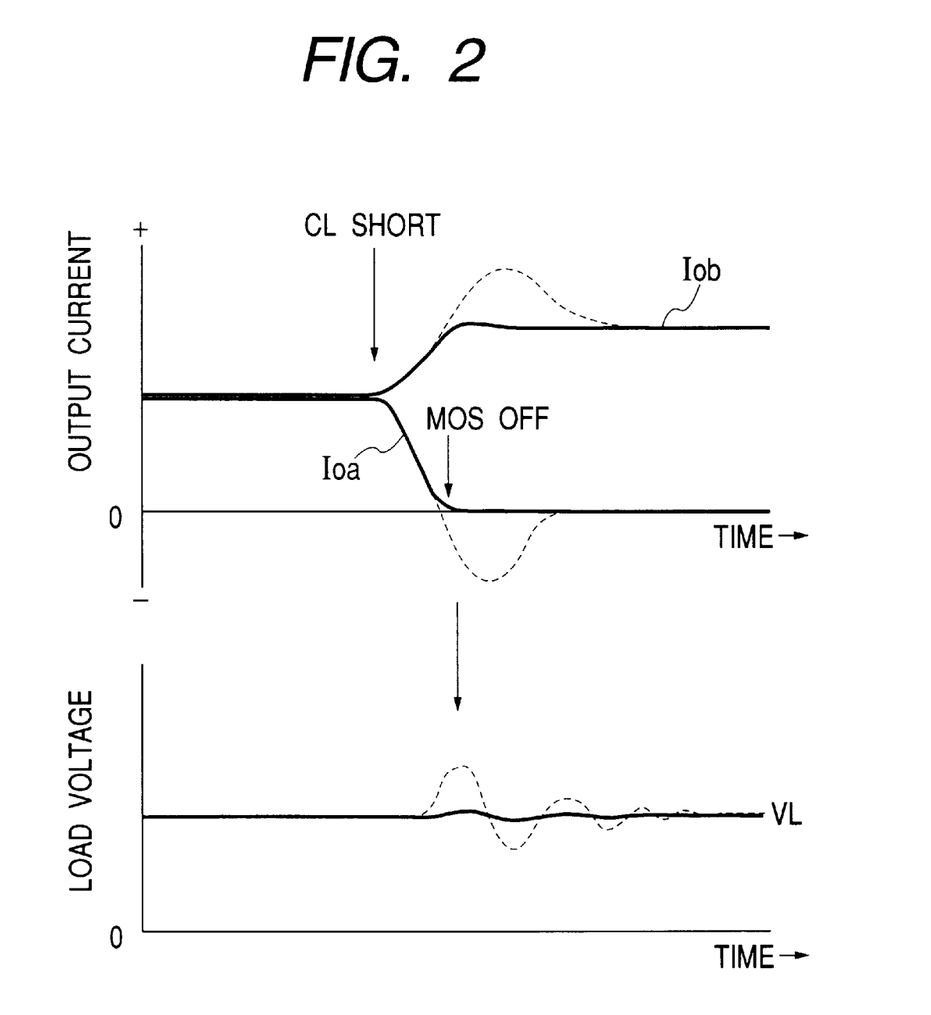
FIG. 2 is a waveform chart showing an example of the operation of the system according to the invention.

FIG. 2 shows a chart of operational waveforms at the essential portions of the system shown in FIG. 1.

In FIGS. 1 and 2, while the power supply units 1A and 1B are operating normally, the output currents Ioa and Iob which are approximately the same are supplied to the load ZL from the output terminals of the units 1A and 1B.

When a failure that the secondary smoothing capacitive element CL is short-circuited occurs in one power supply unit 1A, the emitter potential of the bipolar transistor Q1 drops. The charge voltage of the capacitive element C3 that has been charged via the diode D3 until a point immediately before the occurrence of the short circuit failure is applied to the base of the bipolar transistor Q1. Therefore, the bipolar transistor Q1 is turned on by the base current supplied from the capacitive element C3 hardly with a delay from the short circuit of the secondary smoothing capacitive element CL, thereby clamping the gate-source voltage of the MOS transistor M4 to the OFF level.

In the system illustrated in FIG. 1, as described above, when a short circuit failure occurs in the power supply unit 1A, the inverse-current preventing circuit 4 is activated before the inverse current (the broken-line wavy curves in FIG. 2) flows into the failed unit 1A. This makes it possible to avoid the commutation (the inversion of the polarity of the output current) that causes an excess variation in load voltage VL. It is therefore possible to reduce a voltage loss in the inverse-current preventing circuit 4 provided in each power supply unit 1A, 1B, maintain the flexibility of the system design including lengths of power source wirings and allow the other power supply unit 1B or 1A than one power supply unit 1A or 1B which suffers a short circuit failure to keep supplying power stably without significantly changing a voltage supplied to a load when the short circuit failure has occurred in that power supply unit 1A or 1B.

Figure 3:
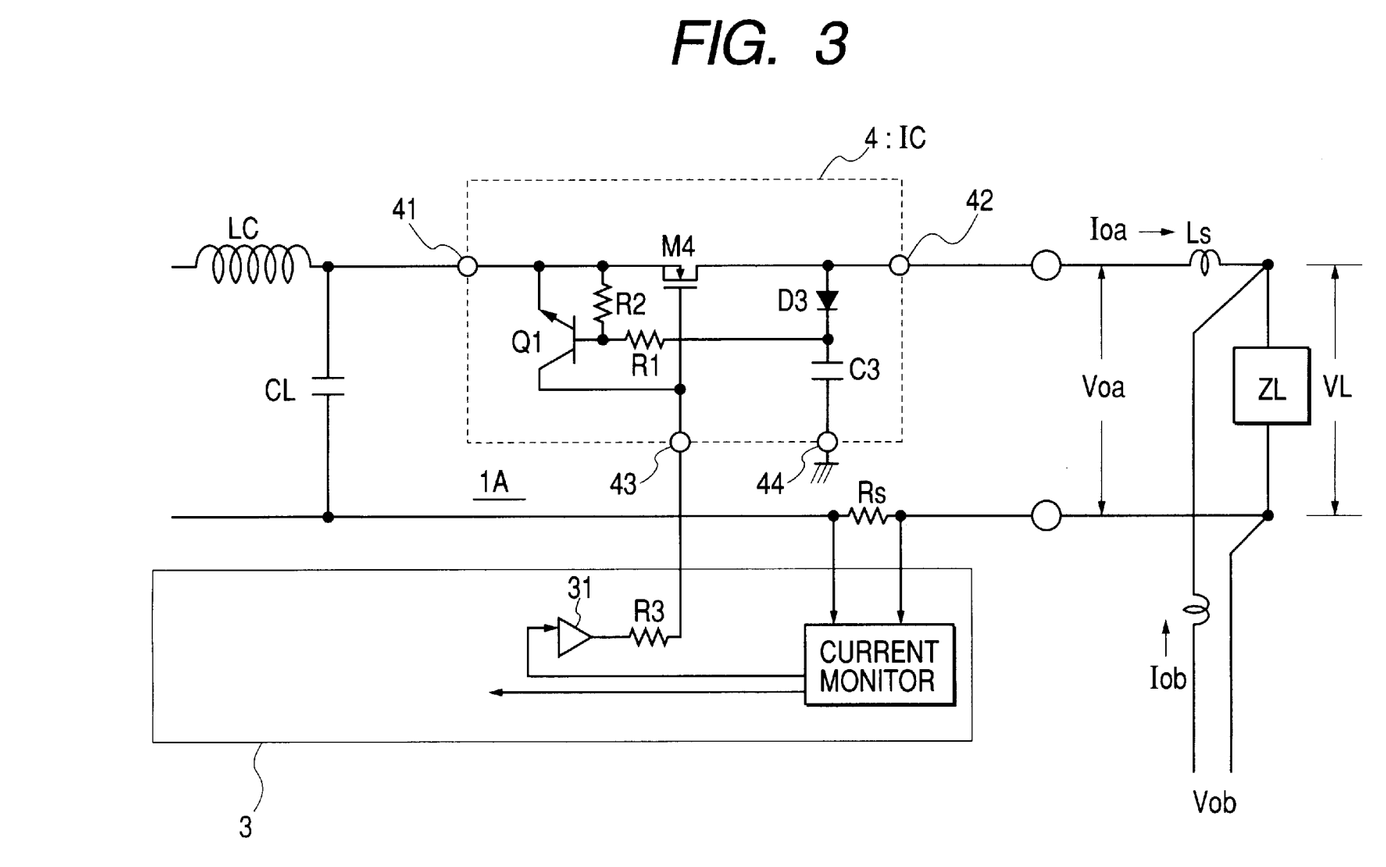
FIG. 3 is a circuit diagram illustrating an embodiment of an inverse-current preventing circuit to be used in the system according to the invention in case where the circuit is designed into an IC.

FIG. 3 illustrates an embodiment in which the inverse-current preventing circuit 4 is designed into an IC unit.

As illustrated in the diagram, the inverse-current preventing circuit 4 can be formed into a unit as an IC (semiconductor integrated circuit) having a current input terminal 41, a current output terminal 42, a control terminal 43 and a common terminal (reference potential) 44 as external terminals.

Figure 4:
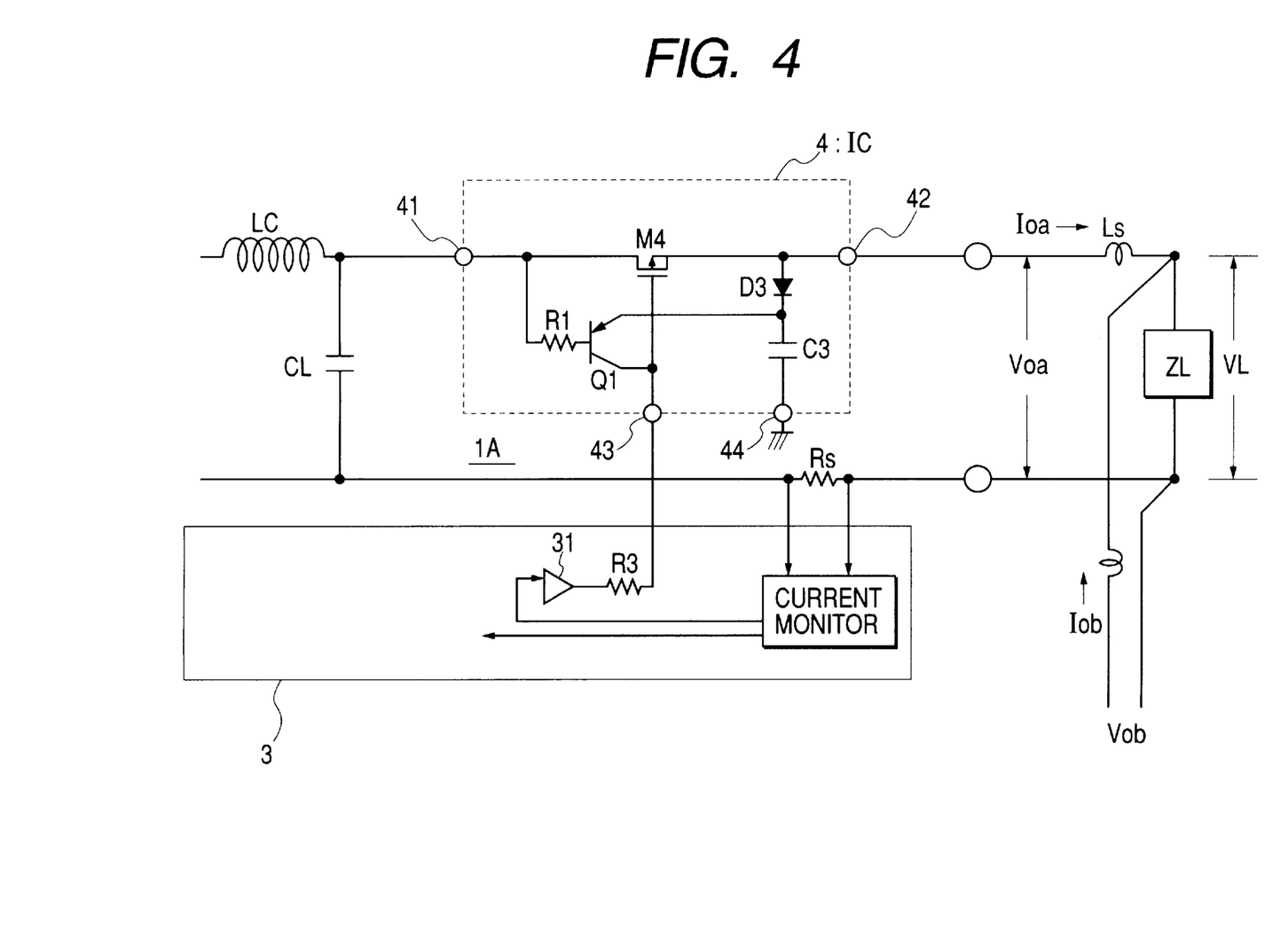
FIG. 4 is a circuit diagram illustrating another embodiment of the inverse-current preventing circuit to be used in the system according to the invention.

FIG. 4 illustrates another embodiment of the inverse-current preventing circuit 4.

In this embodiment, a pnp bipolar transistor Q1 performs clamp control on the gate-source voltage of the MOS transistor M4. In this case, the MOS transistor M4 is connected in such a way that its current input side (that side of the capacitive element CL) serves as a drain and its current output side (the output terminal side) serves as a source. The pnp bipolar transistor Q1 has a collector connected to the gate of the MOS transistor M4, an emitter connected to the charge side of the capacitive element C3 which is charged via the diode D3, and a base connected to the drain of the MOS transistor M4 via the resistive element R1. When the secondary smoothing capacitive element CL has a short circuit failure and the current-input side voltage of the MOS transistor M4 drops abruptly, the bipolar transistor Q1 is turned on to clamp the gate-source voltage of the MOS transistor M4 to the OFF level.

Although the preferred embodiments of the invention have been discussed, the invention is not limited to those embodiments and various design modifications can be made within the scope and spirit of the invention. For example, the potential difference response circuit that performs clamp control of the gate-source voltage of the MOS transistor M4 of the inverse-current preventing circuit 4 may be constituted by using an MOS transistor.

Although the foregoing description has mainly been given of the case where the invention made by the present inventors is adapted to a parallel power source system or the technical field which is the background of the invention, the invention is not limited to this technical field. For example, the invention can be adapted to a parallel addition type power source system which secures the required power capacity by operating a plurality of power source cells, such as solar cells, in parallel.

The following briefly describes the advantage of a typical one of the subject matters of the invention disclosed in the present application.

When a short circuit failure occurs in a power supply unit, the inverse-current preventing circuit is activated before the inverse current flows into the failed unit. This brings about an advantage such that in a parallel power source system which has a plurality of power supply units connected in parallel to one another, it is possible to reduce a voltage loss in an inverse-current preventing circuit provided in each power supply unit, maintain the flexibility of the system design including lengths of power source wirings and allow other power supply units than any power supply unit having a short circuit failure to keep supplying power stably without significantly changing a voltage supplied to a load when the short circuit failure has occurred in that power supply unit.

What is claimed is:

1. A parallel power source system comprising:

a plurality of power supply units for supplying powers from output terminals thereof to a load in parallel; and inverse-current preventing circuits, respectively provided in said power supply units, for preventing inverse currents from said output terminals of said respective power supply units, each inverse-current preventing circuit including an MOS transistor which is intervened in series in an output path and forms a switch circuit for supplying power to a load, and a potential difference response circuit which operates to turn off said MOS transistor when a potential on a current-output side of said MOS transistor becomes greater than a potential on a current-input side thereof by at least a given amount.

2. The parallel power source system according to claim 1, further comprising a current response circuit for controlling said MOS transistor to be turned off when a direction of a current flowing in said output path in each of said power supply units is reversed to a direction of a current flowing in a normal operation.

3. The parallel power source system according to claim 1 or 2, wherein said potential difference response circuit comprises:

a charging circuit for charging a capacitive element in a forward direction of a diode with a potential appearing at an output terminal; and a voltage control transistor which is turned on by a difference between a charge voltage of said charging circuit and a voltage on said current-input side of said MOS transistor to perform clamp control of a gate-source voltage of said MOS transistor.

4. The parallel power source system according to claim 3, wherein said voltage control transistor is a bipolar transistor.

5. A semiconductor integrated circuit including an inverse-current preventing circuit comprising:

a switching MOS transistor for performing ON/OFF control of a current;

a charging circuit for charging a capacitive element in a forward direction of a diode with a potential appearing on a current-output side of said MOS transistor; and a voltage control transistor which is turned on when a charge voltage of said charging circuit becomes higher than a voltage on a current-input side of said MOS transistor by at least a given amount to set a gate-source voltage of said MOS transistor to an OFF level.

* * * * *